United States Patent [19]

Bron

[11] 4,369,923
[45] Jan. 25, 1983

[54] SELF-REGULATING NOZZLE FOR A LIQUID SUPPLY LINE

[76] Inventor: Dan Bron, 36 Palmach St., Haifa, Israel

[21] Appl. No.: 178,117

[22] Filed: Aug. 13, 1980

[30] Foreign Application Priority Data

Sep. 4, 1979 [IL] Israel .................................... 58176

[51] Int. Cl.³ .............................................. B05B 15/00
[52] U.S. Cl. ................................... 239/542; 239/533.1
[58] Field of Search ............... 239/533.1, 533.14, 562, 239/570, 590, 542, 547, 107, 108, 109

[56] References Cited

U.S. PATENT DOCUMENTS

| | | | |
|---|---|---|---|
| 3,777,980 | 12/1973 | Allport | 239/542 |
| 4,161,291 | 7/1979 | Bentley | 239/542 |
| 4,307,841 | 12/1981 | Mehoudar et al. | 239/542 |

Primary Examiner—James B. Marbert

[57] ABSTRACT

There is provided a self-regulating nozzle for a liquid supply line. The nozzle comprises a nozzle body attachable to the line, a vortex chamber within the body and a vortex producing inlet means through which the liquid in the line enters the vortex chamber. One wall of the vortex chamber is constituted by the surface of a stretchable diaphragm, the opposite wall of the chamber is provided with an aperture leading to the consumer and the other surface of the diaphragm is exposed to line pressure. The arrangement is such that the vortex produced by the inlet means results in the creation of a low pressure zone on the surface of the diaphragm which is exposed to the vortex chamber and the effective cross section of the aperture is controlled by the stretching of the stretchable diaphragm.

8 Claims, 3 Drawing Figures

SELF-REGULATING NOZZLE FOR A LIQUID SUPPLY LINE

The present invention relates to a self-regulating nozzle for a liquid supply line. More particularly, the present invention relates to a self-regulating nozzle having a vortex chamber, especially suitable for use as a drip-irrigator or as a spray nozzle.

One known type of a drip irrigation device consists of a control chamber accessible to line pressure. One wall of this chamber is closed by a flexible diaphragm exposed on its outside to line pressure, the opposite wall being provided with an aperture leading to the atmosphere or to the consumer and controllable by a flexing of the diaphragm produced by the difference between the pressure inside the chamber and that prevailing in the line.

While this type of a device constitutes a great improvement in that it permits the output rate to become substantially independent of supply-line pressure fluctuations, it still suffers from the basic problem of most drip-irrigation devices: as supply-line pressures are rather high, while typical output rates are 1-4 liters/hour, the outlet apertures must of necessity be rather small, making them prone to clogging.

It is one of the objects of the invention to overcome the above-described problems and to provide a self-regulating nozzle which, at given line pressures and output rates, permits the use of restricting passageways that are substantially larger than those of comparable prior-art devices.

This object the invention achieves by providing a self-regulating nozzle for a liquid supply line, comprising a nozzle body attachable to said line, a vortex chamber within said body, a vortex producing inlet means through which the liquid in said line enters said vortex chamber, one wall of said chamber being constituted by the surface of a stretchable diaphragm and the opposite wall of said chamber being provided with an aperture leading to the consumer, the other surface of said diaphragm being exposed to line pressure, wherein the vortex produced by said inlet means results in the creation of a low pressure zone on the surface of the diaphragm which is exposed to the vortex chamber and the effective cross-section of said aperture is controlled by the stretching of said stretchable diaphragm.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
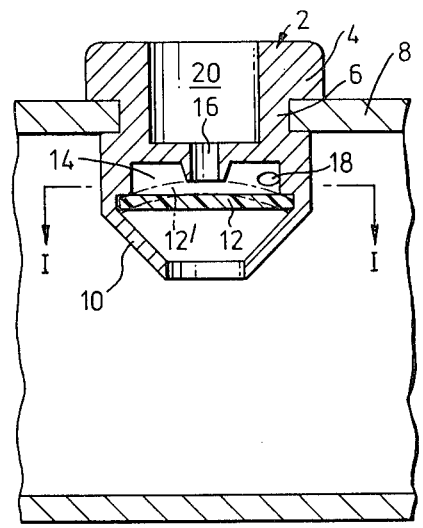
FIG. 1 is a greatly enlarged cross-sectional view of a preferred embodiment of the nozzle according to the invention.
Figure 2:
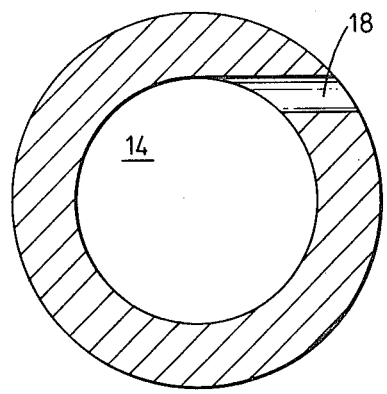
FIG. 2 is a cross-sectional view, along plane I—I in FIG. 1, of the embodiment shown in FIG. 1.

There is seen in FIG. 1 a nozzle body 2 advantageously but not necessarily made of plastics, having a head 4 and a reduced neck section 6 with which it is tightly seated in a hole provided in a supply line 8 made, e.g., of plastic. Located inside the supply line 8 is the rest of the nozzle body 2, comprising an end portion 10, the tapered shape of which, on the outside, facilitates introduction of the nozzle body into the hole in the supply line 8 and, on the inside, is instrumental in loosely retaining an elastomer diaphragm 12 which constitutes one wall of a vortex chamber 14. The opposite wall of this vortex chamber 14 is provided with an outlet aperture 16 which, via an outlet space 20, leads to the atmosphere or to the consumer. Also provided in the vortex chamber 14 there is a tangentially located inlet aperture 18, seen to better advantage in FIG. 2, through which the liquid in the line can enter the vortex chamber 14.

In operation, the nozzle works as follows: If the outlet aperture 16 were closed, pressures on both sides of the stretchable diaphragm would be equal, canceling out one another, and the diaphragm would be in the unstretched position shown in FIG. 1 in solid lines. As it is, however, liquid entering the chamber 14 through the inlet aperture 18, is flowing out through the outlet aperture 16, creating a pressure drop in the chamber 14, which causes the line pressure to bulge the stretchable diaphragm 12 into the chamber 14. The diaphragm thus assumes the position 12' indicated by the broken lines, in which position the outlet aperture 16 is at least partly obturated by the diaphragm 12, thereby reducing the outflow. Reduced outflow, in its turn, reduces the pressure difference acting on the diaphragm 12, thus permitting it to again approach its unbulged state, thereby reducing its obturating effect on the outlet aperture 16, thus permitting a larger output rate. This, in its turn, increases the pressure difference, thereby again increasing the diaphragm bulge, that is, the obturating effect. The diaphragm is thus seen to oscillate about a state of equilibrium which largely depends on the elasticity and stretchability of the diaphragm and its distance from the outlet aperture 16, and which determines the outflow rate of the nozzle.

The substantial improvement in the operational reliability of these devices is introduced by the tangentiality of the inlet aperture 18, which produces a vortex in the vortex chamber 14. This vortex results in the creation of a local low-pressure zone which, in spite of the relatively large diameter of the inlet aperture 18, produces a low flow rate that, without the vortex feature, could be obtained only with a much smaller inlet aperture. The nozzle according to the invention is thus seen to be far less prone to fouling or clogging than any comparable prior-art device.

Figure 3:
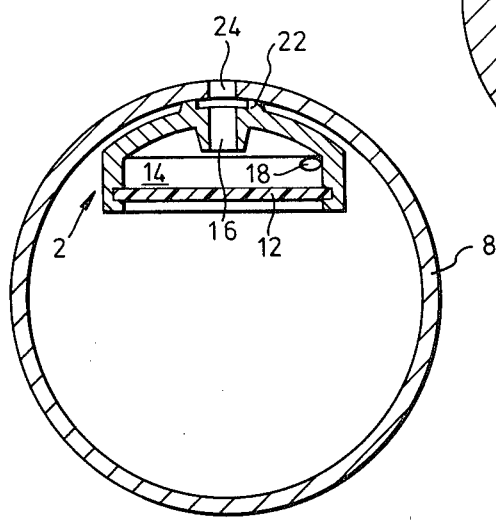
FIG. 3 is a cross-sectional view of another embodiment of the invention, as mounted inside the supply line.
Figure 4:
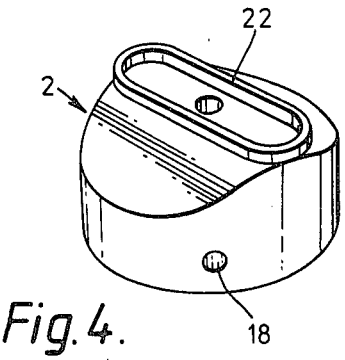
FIG. 4 is a perspective view of the embodiment shown in FIG. 3.

FIG. 3 shows another embodiment of the nozzle according to the invention, in which the nozzle body 2 is entirely in the interior of the supply line 8 and in analogy to the embodiment shown in FIG. 1, is comprised of a tangential inlet aperture 18, a vortex chamber 14, an outlet aperture 16 and a stretchable diaphragm 12. The outside shape of the device according to this embodiment is best understood from the perspective view of FIG. 4. Along the ridge of its upper, outer surface, curved to fit the inside of the supply line 8, the nozzle is provided with a protruding rim 22 surrounding the emerging outlet aperture 16 in a closed, elongated shape. This rim 22 is used to "projection-weld" or otherwise attach the nozzle to the interior of the supply line 8, which is provided with an outlet opening 24 substantially opposite the outlet aperture 16 of the nozzle. Instead of having the elongated shape shown in FIG. 4, the rim 22 could also follow the line of intersection between the two cylindrical surfaces making up the outside shape of the nozzle. Being longer, such a rim 22 would possibly ensure greater mechanical strength to whatever bond is used to attach the nozzle to the inside of the supply line 8. It is important to make sure that liquid from the supply line 8 will be able to reach the outlet opening 24 only via the inlet aperture 18.

The curved top surface of the nozzle body 2 could, of course, also be spherical, with the rim 22, still shaped to fit a section of the interior wall surface of the supply line 8, being part of an elongated central ridge protruding from the sperical top surface.

Figure 5:
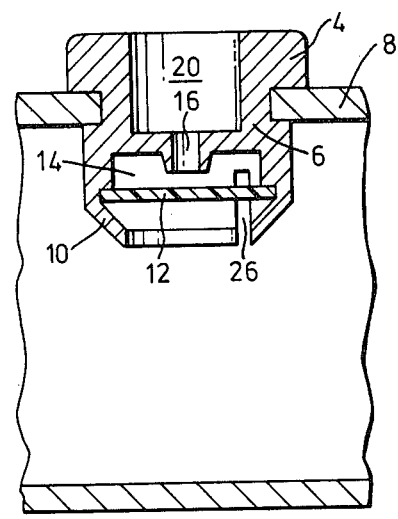
FIG. 5 is a greatly enlarged cross-sectional view of a further embodiment of the nozzle according to the invention.

In FIG. 5 there is shown a slight modification of the nozzle 2 according to the embodiment of FIG. 1 in which the inlet aperture 18, entering the vortex chamber 14, is constituted by a tangentially oriented slot or channel 26 extending along the nozzle body from the edge of the end portion 10 into the vortex chamber 14, not necessarily up to its edge, as shown, but at least along a portion of the nozzle body.

Figure 6:
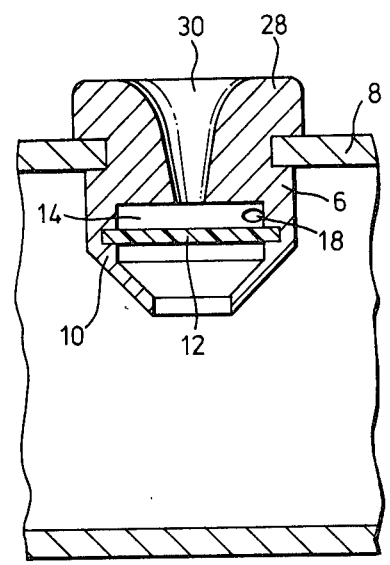
FIG. 6 is an enlarged cross-sectional view of still a further embodiment of the nozzle according to the invention adapted for use as a spray nozzle.

In FIG. 6 there is shown a nozzle according to the invention which is especially adapted to be used as a spray nozzle or an atomizer. As seen, the head section 28 is provided with an outward-flaring or substantially conically shaped outlet orifice 30 to form a self-regulating spray nozzle.

Figure 7:
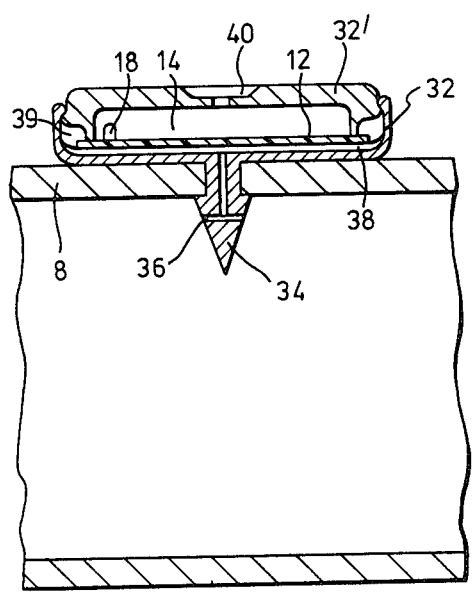
FIG. 7 is a cross-sectional view of another embodiment of the nozzle according to the invention for use as a spray nozzle.

Finally, in FIG. 7 there is illustrated another possible embodiment of a nozzle according to the invention for use as a spray nozzle or an atomizer. As seen, the nozzle is composed of a two-part interlockable body 32, 32' wherein the body part 32 is provided with a tack nipple 34 facilitating its introduction hole into a hole in the supply line 8. The nipple has a hole 36 through which the liquid in the supply line enters the vortex chamber 14 via a groove of grooves 38 cut into the bottom of housing part 32, and from there via an annular space 39 and the tangentially located inlet aperture 18 made in the wall of the body part 32'. The stretchable diaphragm 12 is held in position between the inner peripheral edge of the wall of the body part 32' and the bottom of the housing part 32. The outlet aperture 40 made in the body part 32' may have any desired shape for providing the type of spray required.

While particular embodiments of the invention have been described, it will be evident to those skilled in the art that the present invention may be embodied in other specific forms without departing from the essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What we claim is:

1. A self-regulating nozzle for a liquid supply line, comprising a nozzle body attachable to said line, a cylindrical vortex chamber within said body, a vortex producing inlet means extending tangentially through the wall of said body through which the liquid in said line enters said vortex chamber, one end wall of said cylindrical chamber being constituted by one surface of a stretchable diaphragm and the opposite end wall of said chamber being provided with a central aperture leading to the consumer, the other surface of said diaphragm being exposed to line pressure, wherein the vortex produced within said chamber by flow of liquid through said tangential inlet means results in the creation of a low pressure zone on said one surface of the diaphragm and the effective cross-section of said central aperture is controlled by the stretching of said stretchable diaphragm.

2. The nozzle as claimed in claim 1, wherein a portion of said nozzle is pushed into, the tightly seated in, a hole in said supply line.

3. The nozzle as claimed in claim 1, wherein said nozzle is attached to said supply line from the inside thereof.

4. The nozzle as claimed in claim 3, wherein said nozzle is attached to the inside of said supply line by application of heat and pressure.

5. The nozzle as claimed in claim 3, wherein said nozzle is attached to said supply line with the aid of an adhesive.

6. The nozzle as claimed in claim 1 wherein said vortex-producing inlet means is in the form of a substantially tangential slot reaching from the edge of said end body into said vortex chamber.

7. The nozzle as claimed in claim 1 wherein said aperture leading to the consumer is an outward-flaring aperture forming a self-regulating spray nozzle.

8. The nozzle as claimed in claim 1 wherein said body is a two-part interlockable body and said stretchable diaphragm is held in position between the two body parts, one part of said two-part body being provided with said vortex producing inlet means and with said aperture leading to the consumer and the other part of said two-part body being provided with attachment means to said supply line, said attachment means having liquid inlet means for exposing said other surface of said diaphragm to line pressure and also serving as the inlet for a liquid flow path between the supply line and the vortex producing inlet means.

* * * * *